United States Patent
Takayama (10) Patent No.: US 6,504,558 B1
(45) Date of Patent: Jan. 7, 2003

(54) IMAGE FORMING APPARATUS WITH LASER EMISSION CONTROL

(75) Inventor: Hidemi Takayama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/625,854

(22) Filed: Jul. 26, 2000

(30) Foreign Application Priority Data

Jul. 30, 1999 (JP) ............................................ 11-217265
Jul. 21, 2000 (JP) ........................................ 2000-220522

(51) Int. Cl.⁷ .......................... B41J 2/385; G03G 13/04
(52) U.S. Cl. ....................................... 347/132; 347/133
(58) Field of Search ................................ 347/132, 133, 347/135, 258, 236, 237, 244, 247

(56) References Cited

U.S. PATENT DOCUMENTS

| | | | | |
|---|---|---|---|---|
| 4,379,631 A | * | 4/1983 | Kitamura | |
| 4,443,695 A | * | 4/1984 | Kitamura | ................ 347/133 X |
| 4,967,284 A | * | 10/1990 | Yoshida et al. | ......... 347/133 X |
| 4,978,977 A | * | 12/1990 | Ohmori et al. | .............. 347/258 |
| 5,249,060 A | * | 9/1993 | Ishikawa et al. | ......... 347/132 X |
| 5,432,537 A | * | 7/1995 | Imakawa et al. | ............ 347/135 |
| 5,841,465 A | * | 11/1998 | Fukunaga et al. | ........... 347/258 |

FOREIGN PATENT DOCUMENTS

| | | | |
|---|---|---|---|
| JP | 63-8671 | * | 1/1988 |
| JP | 2-148064 | * | 6/1990 |
| JP | 04-247477 | | 9/1992 |

* cited by examiner

Primary Examiner—Susan S. Y. Lee
(74) Attorney, Agent, or Firm—Fitzpatrick, Cella, Harper & Scinto (57) ABSTRACT

An image forming apparatus which includes a light source for emitting a light beam modulated according to an image signal and an optical deflector for repeatedly deflecting the light beam. A focussing optical system focuses the light beam deflected by the optical deflector on a surface to be scanned to form a light spot there, the surface being scanned repeatedly in a main-scanning direction. A photosensitive member is arranged at the surface and exposed selectively to the light spot, the photosensitive member having an image forming region and blank regions arranged at opposite ends of the image forming region. A developing unit causes toner to adhere to unexposed areas of the selectively exposed photosensitive member and develops an image. A photodetector receives part of the light beam emitted from the light source and an automatic power control circuit controls an output power of the light source on the basis of an output of the photodetector. A drive circuit drives the light source according to the image signal during a period of scanning the image forming region of the photosensitive member and energizes the light source during periods of scanning the blank regions of the photosensitive member. The automatic power control circuit controls the output power of the light source based on a detection by the photodetector during at least one of the periods of scanning the blank regions of the photosensitive member.

28 Claims, 11 Drawing Sheets

IMAGE FORMING APPARATUS WITH LASER EMISSION CONTROL

BACKGROUND OF THE INVENTION

1. Field of the Invention

This invention relates to an apparatus for forming an image by means of an electrophotographic process of scanning a photosensitive member with a light spot. An image forming apparatus according to the invention can suitably be used for a laser beam printer (LBP) or a digital copying machine.

2. Related Background Art

Image forming apparatus including laser beam printers and digital copying machines are designed to use a light beam emitted from a light source such as a semiconductor laser with an intensity modulated according to the image signal applied thereto.

Figure 1:
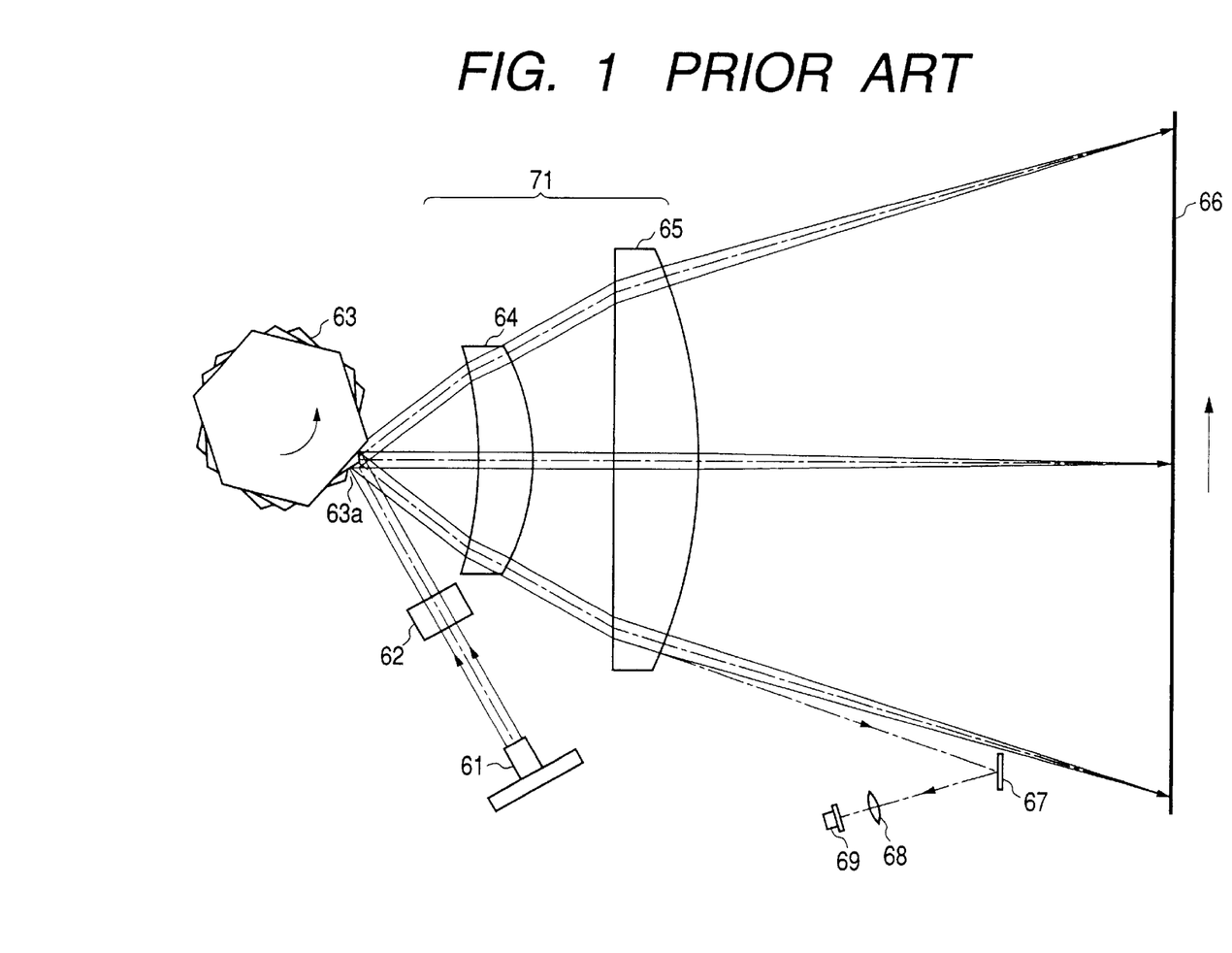
FIG. 1 is a schematic cross sectional view of a principal portion of the optical scanning unit of a known image forming apparatus taken along the main-scanning direction.

FIG. 1 of the accompanying drawings is a schematic cross sectional view of a principal portion of the optical scanning unit of a known image forming apparatus of the above identified type taken along the main-scanning direction. The parallel light beam emitted from a laser unit 61 containing a semiconductor laser is made to enter a cylindrical lens 62 showing a refractive power only in the sub-scanning direction. The parallel light beam entering the cylindrical lens 62 leaves it as parallel light beam in a plane intersecting the optical axis along the main-scanning direction (hereinafter referred to as "main-scanning section") but is converged in a plane intersecting the optical axis along the sub-scanning direction (hereinafter referred to as "sub-scanning section") to form a linear image extending in the main-scanning direction on deflection plane 63a of an optical deflector 63, which is typically a polygon mirror. The light beam reflected/deflected by the deflection plane 63a of the optical deflector 63 is then led to the surface to be scanned of a photosensitive drum 66 by way of a focussing optical system (fθ lens system) 71 having an fθ feature to form a light spot on the surface. Then, the surface of the photosensitive drum 66 is repeatedly scanned by the light spot. The focussing optical system 71 comprises a spherical lens 64 and a toric lens 65.

The optical scanning unit is provided with a BD (beam detector) sensor 69, which is a photodetector for regulating the timing of the image forming operation to be conducted on the surface of the photosensitive drum 66 before the light spot starts scanning the surface of the photosensitive drum 66. The BD sensor 69 receives the part of the light beam deflected by the optical deflector 63 that gets to a region outside the image forming region of the surface of the photosensitive drum 66 before scanning the image forming region. This part of the light beam is referred to as BD beam. It is reflected by a BD mirror 67 and then condensed by a BD lens (condenser lens) 68 before it enters the BD sensor 69. A BD signal (synchronizing signal) is detected from the output of the BD sensor 69 and the timing of starting the image recording operation on the photosensitive drum 66 is regulated on the basis of the BD signal.

The photosensitive drum 66 is driven to rotate at a constant rate in synchronism with the drive signal from the semiconductor laser in the laser unit 61, whereby the photosensitive surface of the photosensitive drum 66 is driven to move in the sub-scanning direction relative to the light spot scanning the surface. Then, an electrostatic latent image is formed on the surface of the photosensitive drum 66, subsequently developed by means of a known electrophotographic process and thereafter transferred onto an image receiving member such as a sheet of paper to produce a finished image thereon.

Meanwhile, the optical scanning unit is provided with an automatic power control (APC) circuit for controlling the power of the light beam emitted from the semiconductor laser, although the APC circuit is not shown in FIG. 1. The laser unit of FIG. 1 is provided with the semiconductor laser and a photodetector for detecting part of the light beam emitted from the semiconductor laser. The APC circuit samples the output of the photodetector at predetermined timing and controls the output power of the semiconductor laser on the basis of the sampled output levels.

Figure 2A:
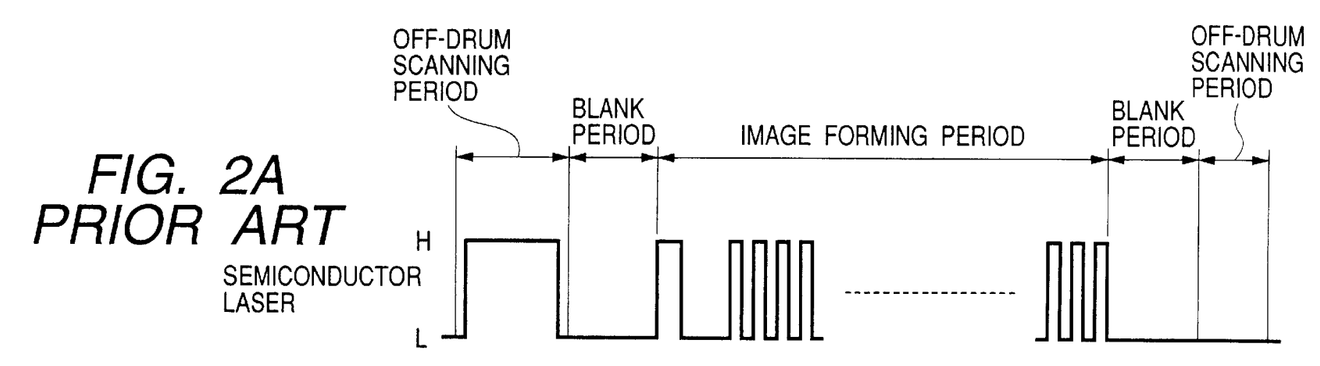
FIGS. 2A, 2B and 2C are respective timing charts of operation of the semiconductor laser, the BD sensor and the APC circuit of the apparatus of FIG. 1.
Figure 2B:
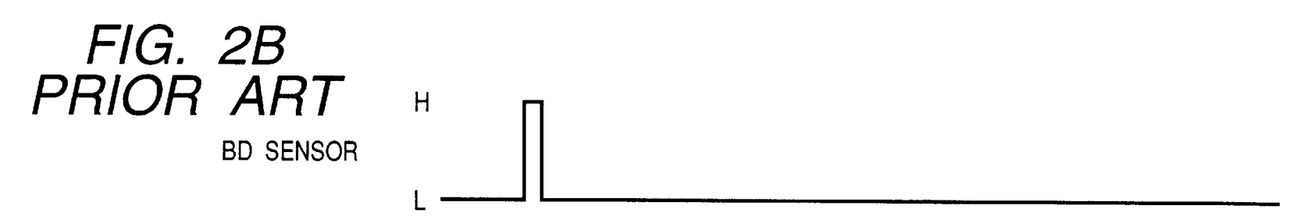
Figure 2C:
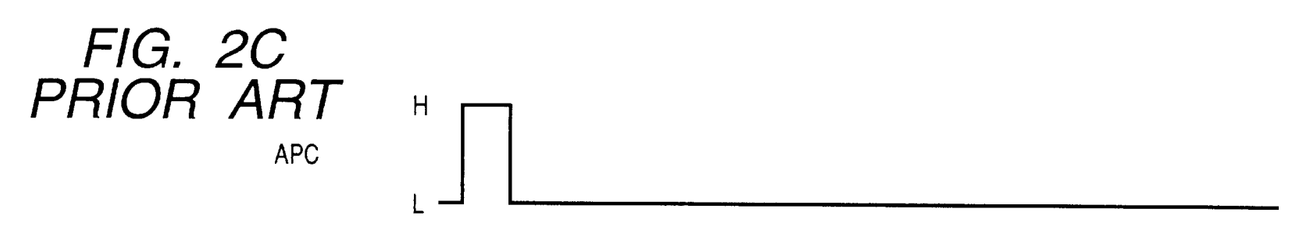

FIGS. 2A through 2C are respective timing charts of operation of the semiconductor laser, the BD sensor and the APC circuit of a known image forming apparatus of the type under consideration for the period of a scanning cycle of the light spot that is made to scan the photosensitive drum repeatedly. FIG. 2A shows the operation of the semiconductor laser. It will be seen from FIG. 2A that the semiconductor laser is ON when the signal applied to it is at level High (H) and OFF when the signal is at level Low (L). FIG. 2B shows the operation of the BD sensor. It operates to detect the BD signal (synchronizing signal) when the signal applied to it is at level High (H). FIG. 2C shows the operation of the APC circuit. It operates to control the output power of the semiconductor laser when the signal applied to it is at level High (H).

The photosensitive drum used for the image forming apparatus has a image forming region (effective image region) and blank regions (non-image-forming regions) arranged at the opposite sides of the image forming region in the main-scanning direction. The toner image formed in the image forming region is ultimately transferred onto an image receiving member. Assuming that a light spot is made to scan the surface of the photosensitive drum in the main-scanning direction, the period during which it scans the image forming region is referred to as image forming period whereas the period during which it scans either of the blank regions is referred to as blank period. As seen from FIG. 2A, a blank period exists before and after an image forming period. Additionally, there exists a period during which the light spot scans not the surface of the photosensitive drum but outside the surface before and after each blank period. This period is referred to as off-drum scanning period.

As seen from FIG. 2A, the light beam emitted from the semiconductor laser during an image forming period is modulated by the image signal applied to it and the light spot scanning the surface of the photosensitive drum is turned on/off accordingly. The surface of the photosensitive drum is electrified in advance and, as the surface is irradiated with the light spot whose intensity is modulated, the electric potential of the surface of the photosensitive drum becomes differentiated as a function of the location on the surface to form an electrostatic latent image there. More specifically, any area on the surface of the photosensitive drum irradiated with light (exposed area) loses the electric charge whereas any area on the surface of the photosensitive drum not irradiated with light (unexposed area) retains the electric charge.

In known image forming apparatus, toner of the type showing the polarity same as the electric charge that electrifies the surface of the photosensitive drum in advance is used onto the electrostatic latent image formed thereon in a manner as described above for socalled reversal development. In other words, an exposed area becomes a printed area (area carrying the toner) because, if an unexposed area is made to become a printed area, the period for which the semiconductor laser is turned on for printing should be made relatively long.

The operation of automatic power control (APC) of controlling the output power of the semiconductor laser of the image forming apparatus is made to take place in the off-drum scanning period preceding an image forming period as shown in FIG. 2C. Then, the operation of the BD sensor for detecting a BD signal (synchronizing signal) is made to take place after the automatic power control operation also in the same off-drum scanning period that also precedes the image forming period as shown in FIG. 2B. While it is theoretically not necessary to energize the semiconductor laser in the off-drum scanning period, the semiconductor laser is in reality energized in the period during which the APC operation and the BD signal detecting operation take place as shown in FIG. 2A. The semiconductor laser is not energized in the blank period because the toner adheres to the blank region if semiconductor laser is energized in that period. While the blank region is not the area from which the toner is transferred to the image receiving member, the toner can adhere to the edges of the image receiving member when the image is ultimately transferred thereto if a slightest time lag occurs in the image transferring operation. This is the reason why the semiconductor laser is not energized conventionally in the blank period.

Referring to FIGS. 2A through 2C, the ratio of the image forming period relative to the overall scanning period of the light spot is referred to as scanning efficiency. The scanning efficiency should be high for a high definition image forming apparatus that is required to operate at high speed. However, the time allocated to the APC operation is reduced to make the operation less stable if the scanning efficiency is made to high.

Meanwhile, Japanese Patent Application Laid-Open No. 4-247477 describes an image recording apparatus in which BD signals are detected during the blank period before the image forming period and APC operation is conducted during the blank period after the image forming period. However, in the apparatus described in Japanese Patent Application Laid-Open No. 4-247477, the semiconductor laser is energized during the blank periods and accordingly, a light shielding member must be provided between the optical deflector and the photosensitive drum so that the light beam from the semiconductor laser may not get to the photosensitive drum, which will result in a complicated structure and interfere with realizing a compact device. Further, even a slight misarrangement of the light shielding member can expose the blank region partially and cause adhesion of toner on the exposed area. Then, the toner adhering to the blank region can be transferred to an edge of a sheet of paper if the positional relation between the drum and the sheet of paper is not accurate.

SUMMARY OF THE INVENTION

In view of the above circumstances, it is therefore the object of the present invention to provide an image forming apparatus that affords a stable automatic power control (APC) operation to be conducted without complicating the constitution and sacrificing the scanning efficiency.

According to the invention, the above object is achieved by providing an image forming apparatus comprising:

a light source adapted to emit a light beam modulated according to the image signal applied thereto;

an optical deflector for repeatedly deflecting the light beam emitted from the light source;

a focussing optical system for focussing the light beam deflected by the optical deflector on a surface to be scanned to form a light spot there, the surface to be scanned being scanned repeatedly in the main-scanning direction;

a photosensitive member arranged on the surface to be scanned and exposed selectively to said the spot, the photosensitive member having an image forming region and blank regions arranged at the opposite ends of the image forming region in the main-scanning direction;

a motor for driving the photosensitive member to move in the sub-scanning direction perpendicular to the main-scanning direction;

a developing unit for causing toner to adhere to the unexposed areas of the selectively exposed photosensitive member and developing an image;

a photodetector for receiving part of the light beam emitted from the light source;

an automatic power control circuit for controlling the output power of the light source on the basis of the output of the photodetector; and a drive circuit for driving the light source, the drive circuit being adapted to drive the light source according to the image signal applied thereto during the period of scanning the image forming region of the surface of the photosensitive member by the light spot and energize the light source during the entire period of scanning the blank regions of the surface of the photosensitive member by the light spot;

the automatic power control circuit controlling the output power of the light source during the period of scanning the blank regions of the surface of the photosensitive member by the light spot.

DESCRIPTION OF THE PREFERRED EMBODIMENTS

Now, the present invention will be described in greater detail by referring to the accompanying drawings that illustrate preferred embodiments of the invention.

Figure 3:
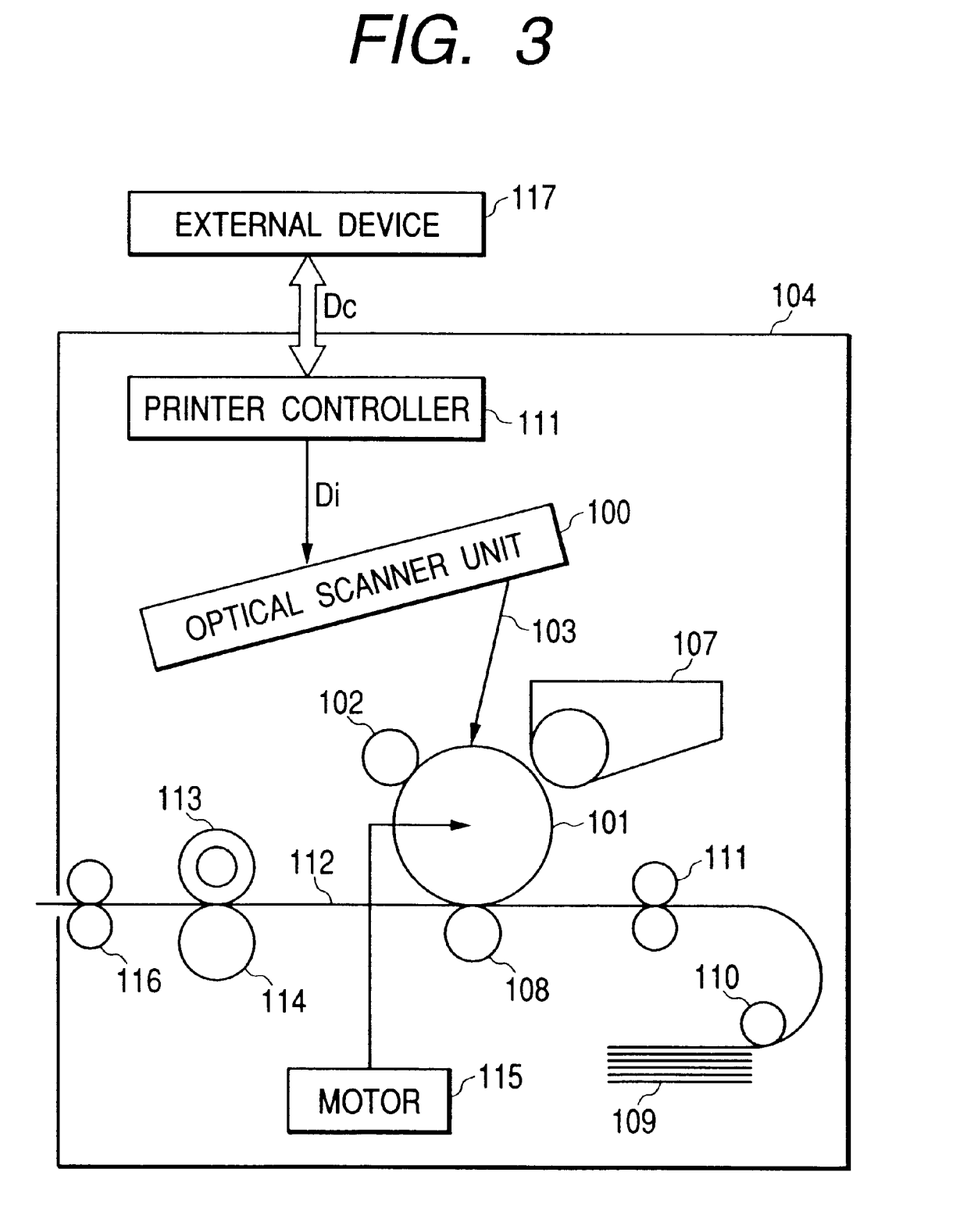
FIG. 3 is a schematic cross sectional view of a principal portion of a preferred embodiment of image forming apparatus according to the invention taken along the sub-scanning direction.

FIG. 3 is a schematic cross sectional view of a principal portion of a preferred embodiment of image forming apparatus according to the invention taken along the sub-scanning direction. Referring to FIG. 3, reference symbol 104 denotes an image forming apparatus, which is adapted to receive code data Dc from an external device 117 that may be a personal computer. The code data Dc is converted into an image data (dot data) Di by printer controller 111 arranged within the apparatus. The image data Di is then input to optical scanning unit 100, which optical scanning unit 100 then emits a light beam 103 that is modulated according to the image data Di and made to scan the photosensitive surface of photosensitive drum 101 in the main-scanning direction.

The photosensitive drum 101 operating as electrostatic latent image carrier (photosensitive member) is driven to rotate clockwise by motor 115. As the photosensitive drum 101 rotates, the photosensitive surface of the drum 101 moves relative to the light beam 103 in the sub-scanning direction that is perpendicular to the main-scanning direction. An electrifying roller 102 is disposed above and held in touch with the photosensitive drum 101 in order to uniformly electrify the surface of the photosensitive drum 101. Then, the light beam 103 is irradiated onto the surface of the photosensitive drum 101 that is electrified by the electrifying roller 102 and made to scan the surface by said optical scanning unit 100.

As pointed out above, the light beam 103 is modulated according to the image data Di so that an electrostatic latent image is formed on the surface of the photosensitive drum 101 as the surface is irradiated with the light beam 103. The electrostatic latent image is developed to a toner image by developing unit 107 that is located downstream relative to the light spot formed by the light beam 103 on the surface of the photosensitive drum 101 and held in touch with the surface. Note that the particles of the toner used here show the polarity opposite to that of the electric charge produced by the electrifying roller 102. Toner is made to stick to the areas (printing areas) of the surface of the photosensitive drum that are not exposed to light. In other words, with this embodiment, the latent image is not reversely but normally developed.

The toner image developed by the developing unit 107 is then transferred onto a sheet of paper 112, which is also referred to as image receiving member, by transfer roller 108 arranged downward and vis-a-vis relative to the photosensitive drum 101. While the sheet of paper 112 is supplied from a paper cassette 109 arranged in front of the photosensitive drum 101 (rightward relative to the drum in FIG. 3), it may alternatively be fed by hand. The paper cassette 109 is provided at an end thereof with a paper feed roller 110, which actually takes the part of feeding the sheet of paper 112 to the sheet conveying path by way of register roller 111.

Then, the sheet of paper 112 now carrying an unfixed toner image is conveyed to a fixing unit arranged behind the photosensitive drum 101 (leftward relative to the drum in FIG. 3). The fixing unit comprises a fixing roller 113 containing a fixing heater in the inside (not shown) and a pressure roller 114 arranged so as to be pressed against the fixing roller 113. The unfixed toner image on the sheet of paper 112 conveyed from the transfer unit is fixed as the sheet of paper 112 is heated by the heater while it is held under pressure between the pressure areas of the fixing roller 113 and the pressure roller 114. A pair of delivery rollers are arranged behind the fixing roller 113 and the sheet of paper 112 now carrying the fixed image is delivered to the outside of the image forming apparatus.

While not shown in FIG. 3, the printer controller 111 not only operates for data conversion in a manner as described above but also controls the components of the image forming apparatus and the polygon motor arranged in the optical scanning unit as will be discussed hereinafter.

Figure 4:
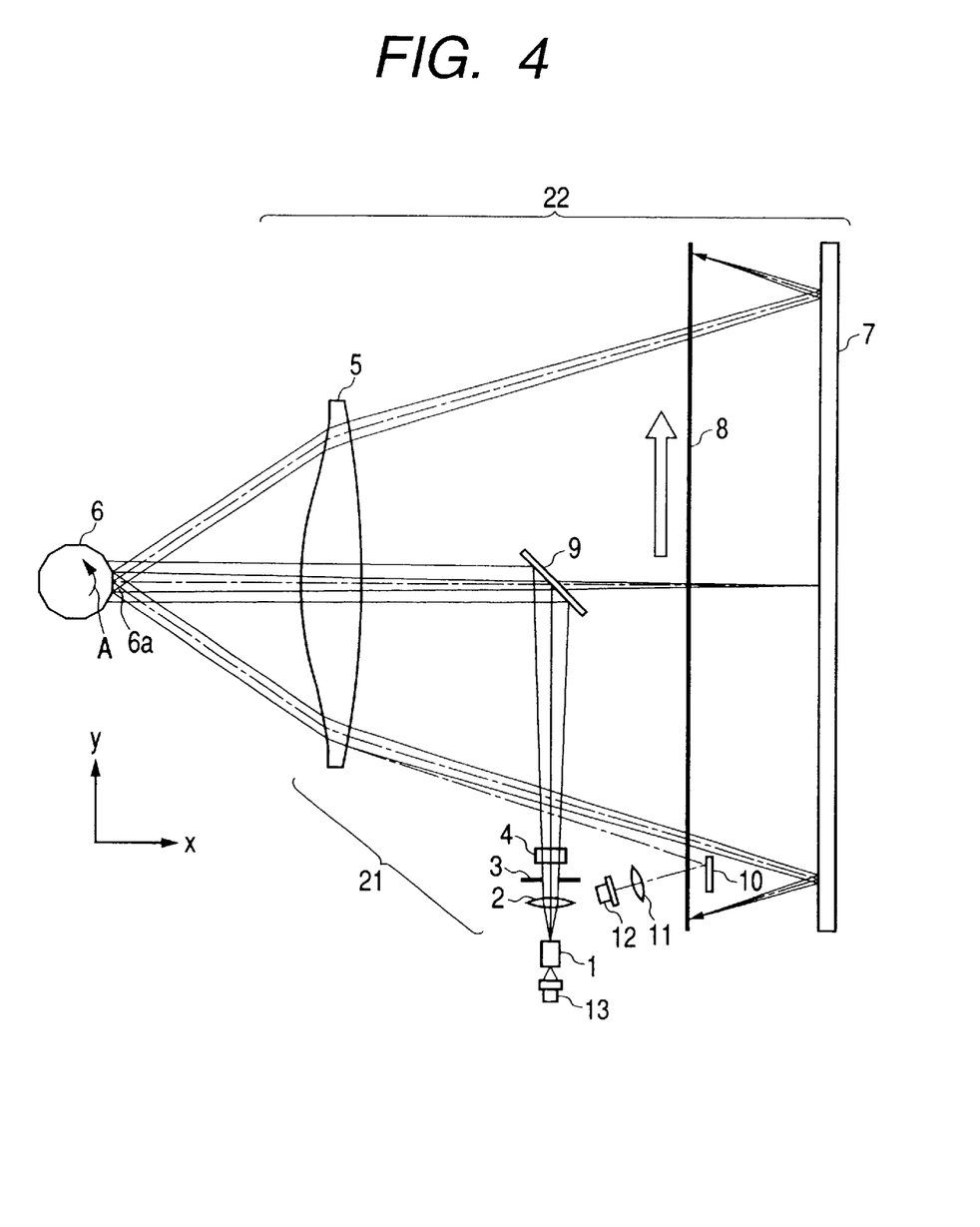
FIG. 4 is a schematic cross sectional view of a principal portion of the optical scanning unit of the image forming apparatus of FIG. 3 taken along the main-scanning direction.
Figure 5:
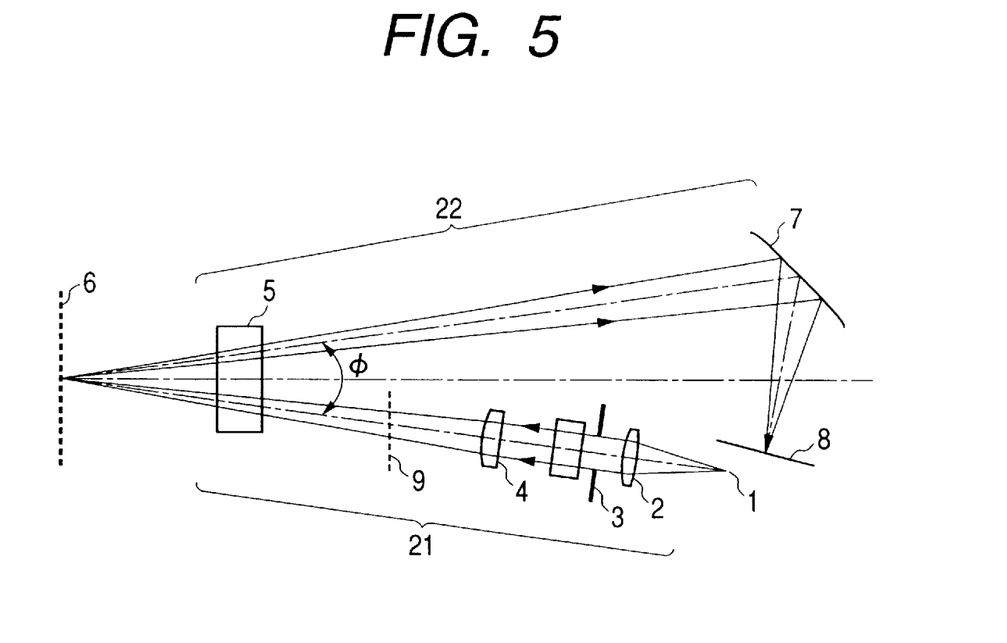
FIG. 5 is a schematic cross sectional view of a principal portion of the optical scanning unit of FIG. 4 taken along the sub-scanning direction.
Figure 6:
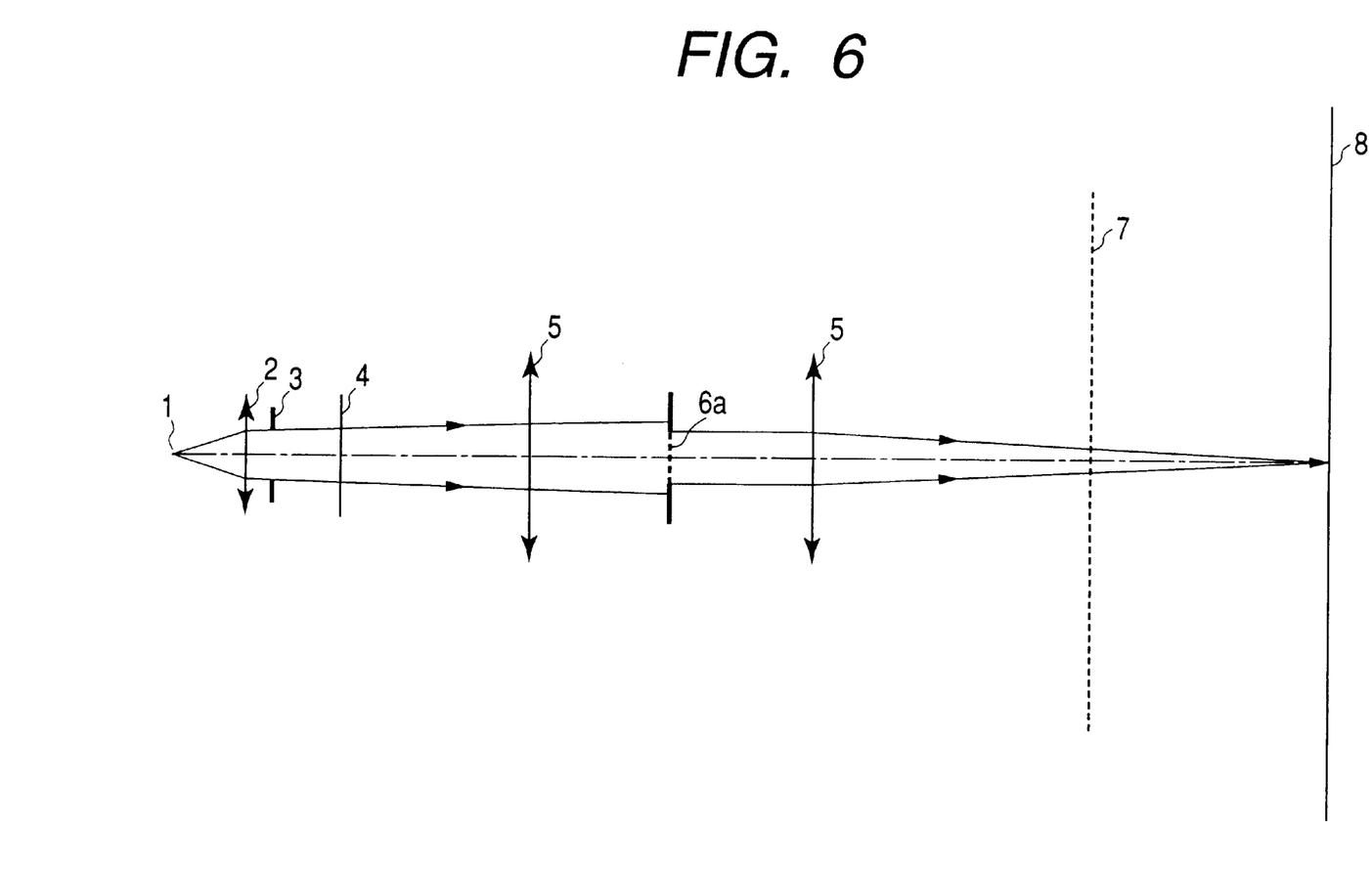
FIG. 6 is a schematic view of the optical system of the optical scanning unit of FIG. 4 extended along the light beam in the main-scanning direction.
Figure 7:
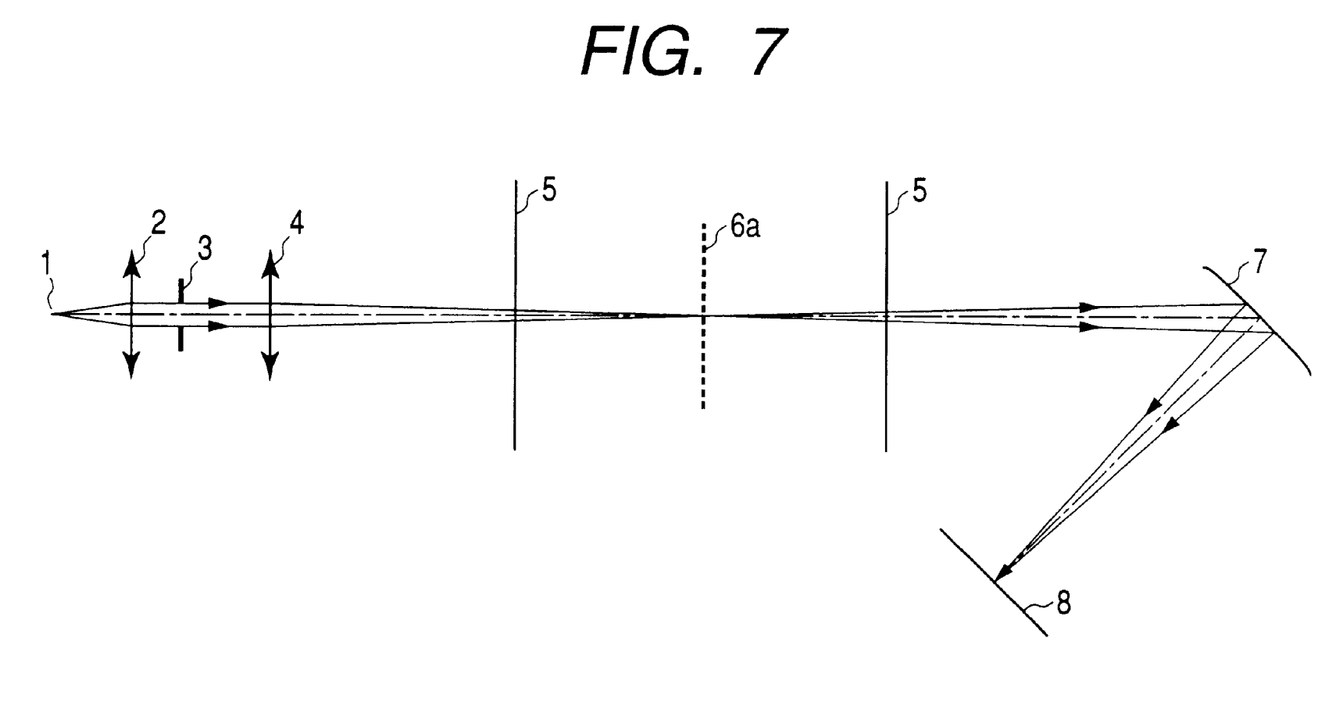
FIG. 7 is a schematic view of the optical system of the optical scanning unit of FIG. 4 extended along the light beam in the sub-scanning direction.

FIG. 4 is a schematic cross sectional view of a principal portion of the optical scanning unit of the image forming apparatus of FIG. 3 taken along the main-scanning direction and illustrating the configuration of the optical scanning unit. FIG. 5 is a schematic cross sectional view of a principal portion of the optical scanning unit of FIG. 4 taken along the sub-scanning direction and FIG. 6 is a schematic view of the optical system of the optical scanning unit of FIG. 4 extended along the light beam in the main-scanning direction, while FIG. 7 is a schematic view of the optical system of the optical scanning unit of FIG. 4 extended along the light beam in the sub-scanning direction. Throughout FIGS. 4 through 7, the same components are denoted respectively by the same reference symbols. In this embodiment, a so-called overfilled optical system (OFS) that is suited for a high speed and high definition image forming apparatus is used. An OFS is an optical system where the light beam striking a rotary polygon mirror has a width greater than that of one of the plurality of deflection planes (reflection planes) of the rotary polygon mirror as viewed in the main-scanning direction.

In FIGS. 4 through 7, reference symbol 1 denotes a semiconductor laser operating as light source. The semiconductor laser is driven to emit a light beam (laser beam) by a laser drive signal, which will be discussed hereinafter. Reference symbol 2 denotes a collimator lens. The collimator lens 2 changes the divergent light beam emitted from the semiconductor laser 1 to a collimated light beam. The semiconductor laser 1 may be integrally arranged with the collimator lens 2. Reference symbol 3 denotes an aperture stop. The aperture stop 3 limits (the quantity of light of) the light beam passing therethrough.

Reference symbol 4 denotes a cylindrical lens (cylinder lens). The cylindrical lens 4 shows a predetermined refractive power only in the sub-scanning direction so that it focusses the light beam passing through the aperture stop 3 on the deflection plane (reflection plane) 6a of the optical deflector 6, which will be described hereinafter, to form a linear image extending in the main-scanning direction in the sub-scanning section. Reference symbol 9 denotes a fold mirror. The fold mirror 9 folds back the incident light beam to the optical deflector 6. Note that the collimator lens 2, the aperture stop 3, the cylindrical lens 4 and the fold mirror 9 form an incident optical system (first optical system) 21.

Reference symbol 6 denotes an optical deflector. The optical deflector 6 is typically a polygon mirror that is driven to turn at a constant rate in the sense of arrow A by a polygon motor (not shown).

Reference symbol 22 denotes a focussing optical system (second optical system) showing a condensing effect and an fθ feature. The focussing optical system 22 comprises a single fθ lens (fθ lens system) 5 and a cylindrical mirror 7 showing a predetermined power only in the sub-scanning direction and adapted to focus the deflected light beam from the optical deflector 6 on the surface to be scanned 8. The focussing optical system 22 establishes an optically conjugate relationship between the deflection plane 6a of the optical deflector 6 and the surface to be scanned 8. Such an arrangement is referred to as that of tilt correction and used to compensate the processing error of the deflection plane 6a of the optical deflector 6 and the tilt of the deflection plane 6a due to the tilt of the axis of rotation of the optical deflector 6. Note that the light beam striking the optical deflector 6 has passed through the fθ lens 5 once. In other words, the fθ lens 5 is also a component of the incident optical system 21. While the fθ lens system of this embodiment comprises a single lens, it may alternatively comprise a plurality of lenses. Also note that the surface to be scanned 8 corresponds to the photosensitive surface of the photosensitive drum 101 in FIG. 3.

The optical scanning unit of this embodiment comprises a BD sensor 12 operating as photodetector and adapted to regulate the timing of starting an image forming operation before scanning the image forming region on the surface to be scanned (of the photosensitive drum) 8. The BD sensor 12 receives a BD light beam that is the part of the light beam deflected by the optical deflector 6 and scanning the regions (blank region) other than the image forming region before scanning the latter on the surface of the photosensitive drum 101. The BD light beam is reflected by BD mirror (synchronizing signal detection mirror) 10 and condensed by BD lens (condenser lens) 11 before entering BD sensor 12. The BD signal (synchronizing signal) is detected from the output signal of the BD sensor 12 and the timing of starting the image forming operation on the surface to be scanned 8 is regulated on the basis of the detected BD signal.

Reference symbol 13 in FIG. 4 denotes a photodetector for receiving part of the light beam emitted from the semiconductor laser 1 and carrying out an automatic power control operation for the embodiment. The photodetector 13 of this embodiment is adapted to receive the light beam emitted from the facet of the semiconductor laser 1 opposite to the one facing the collimator lens 2. As described hereinafter, the semiconductor laser 1 and the photodetector 13 are contained in the same housing of the laser unit. Note that the photodetector 13 is not shown in FIGS. 5 through 7.

The above described components 1 through 13 are so arranged that the scanning efficiency of the embodiment of image forming apparatus shows a value higher than 70%.

Figure 8:
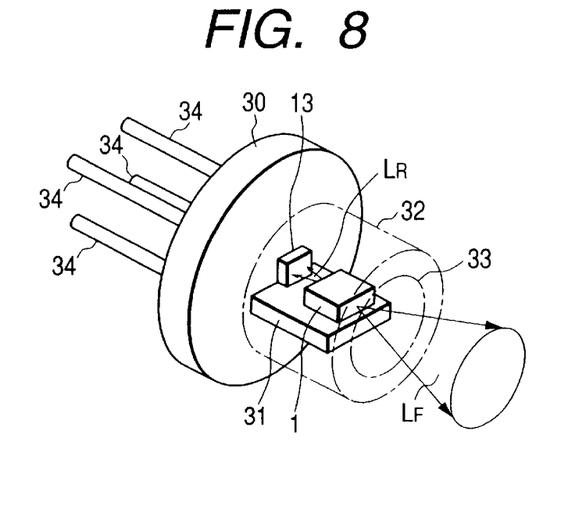
FIG. 8 is a schematic perspective view of the laser unit used in the optical scanning unit of FIG. 4.

FIG. 8 is a schematic perspective view of the laser unit used in this embodiment. The stem 30 of the laser unit comprises a base 31, on which the semiconductor laser 1 is mounted. The semiconductor laser 1 is so adapted to emit light beam $L_F$ and laser beam $L_R$ respectively from oppositely disposed facets thereof. The light beam $L_R$ emitted from the rear facet of the semiconductor laser 1 is received by the photodetector 13 also mounted on the base 31. The base 31, the semiconductor laser 1 and the photodetector 13 are contained in a cap 32 fitted to stem 30. The light beam $L_F$ emitted from the front facet of the semiconductor laser 1 is transmitted to the outside through window 33 arranged to the cap 32. The window is provided with a light transmitting member typically made of glass. The drive signal sent to the semiconductor laser 1 is input to it by way of energization terminal 34. On the other hand, the output signal of the photodetector 13 is sent out also by way of the energization terminal 34. The operation of automatic power control (APC) is performed by using the output signal of the photodetector 13.

Figure 9:
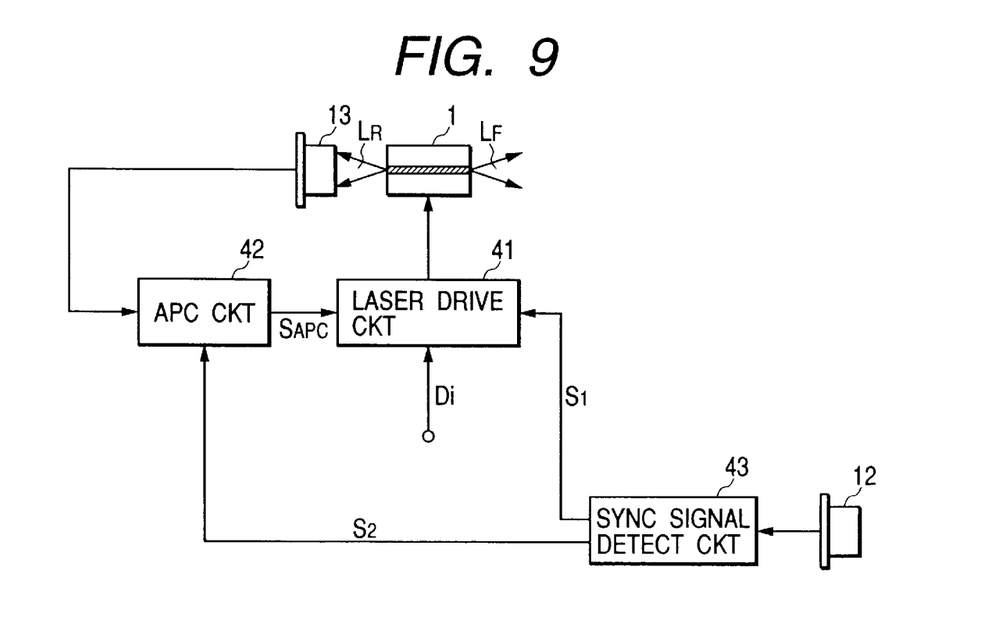
FIG. 9 is a schematic circuit diagram of the control circuit arranged in the optical scanning unit of FIG. 3.

FIG. 9 is a schematic circuit diagram of the control circuit arranged in the optical scanning unit 100 of FIG. 3. The image data Di transmitted from the printer controller 111 of FIG. 3 is input to laser drive circuit 41. The laser drive circuit 41 operates so as to allow the semiconductor laser 1 to emit the light beam that is modulated according to the image data Di input to it so long as the light spot of the light beam is scanning the image forming region. Meanwhile, synchronizing signal detecting circuit 43 detects BD signals (synchronizing signals) $S_1$ and $S_2$ on the basis of the output signal of the BD sensor 12, of which the BD signal $S_1$ is input to the laser drive circuit 41 and the timing of starting the image forming operation is controlled on the basis of the BD signal $S_1$.

Referring to FIG. 9, the light beam $L_F$ emitted from the front facet of the semiconductor laser 1 is led to the optical deflector 6 by way of the incident optical system 21 shown in FIGS. 4 through 7 in order to actually scan the surface to be scanned 8. On the other hand, the light beam $L_R$ emitted from the rear facet of the semiconductor laser 1 is received by the photodetector 13. The output signal of the photodetector 13 is applied to the automatic power control (APC) circuit 42. The APC circuit typically comprises a sample and hold circuit and a comparator circuit for comparing the sampled value of the sample and hold circuit and a reference value. The control signal $S_{APC}$ output from the APC circuit is input to the laser drive circuit 41 and the output power of the semiconductor laser 1 is controlled on the basis of the control signal $S_{APC}$. The timing of the APC operation is determined by the BD signal $S_2$ sent from the synchronizing signal detecting circuit 43.

In this embodiment, the divergent light beam emitted from the semiconductor laser 1 is collimated by the collimator lens 2 in the main-scanning section as shown in FIG. 4. The collimated light beam is then limited by the aperture stop 3 for the quantity of light before entering the cylindrical lens 4. The collimated light beam that enters the cylindrical lens 4 then leaves the lens without being modified and is reflected by the fold mirror 9 to pass through the fθ lens 5 before striking the deflection plane 6a of the optical deflector 6 substantially along the center of the deflection angle of the optical deflector 6. This arrangement is referred to as front incidence. The light beam striking the optical deflector 6 has a width greater than that of the deflection plane 6a of the optical deflector 6 as viewed in the main-scanning direction. As pointed out above, such an optical system is referred to as overfilled optical system. The light beam deflected and reflected by the deflection plane 6a of the optical deflector 6 is then converged as it is made to pass through the fθ lens 5 for another time before it is led to the surface of the photosensitive drum 8 by way of the cylindrical mirror 7. Note that the light beam is made to pass through the fθ lens 5 twice. This arrangement is referred to as double pass.

In this embodiment, the divergent light beam emitted from the semiconductor laser 1 is collimated by the collimator lens 2 in the sub-scanning section as shown in FIG. 5 and limited by the aperture stop 3 for the quantity of light before entering the cylindrical lens 4. The collimated light beam that enters the cylindrical lens 4 is converged and reflected by the fold mirror 9. The convergent light beam reflected by the fold mirror 9 is transmitted through the fθ lens 5 to strike the deflection plane 6a of the optical deflector 6 with a predetermined non-zero angle of incidence, which may be φ/2, relative to the normal to the deflection plane 6a. Such an arrangement is referred to slantingly incident optical system. The light beam deflected/reflected by the optical deflector 6 is prevented from interfering with the light beam striking the optical deflector 6 by way of the slantingly incident optical system as the latter is made inclined relative to the deflection plane 6a. The light beam deflected/reflected by the deflection plane 6a of the optical deflector 6 is made to pass through the fθ lens 5 once again and converged by the cylindrical mirror 7 before it is focussed on the surface to be scanned (surface of the photosensitive drum) 8 to form a light spot.

Before scanning the surface to be scanned (surface of the photosensitive drum) 8 with the light spot, the BD light beam taken as part of the light beam deflected by the optical deflector 6 is reflected by the BD mirror 10 and led to the BD lens 11 and then to the BD sensor 12 in order to regulate the timing of starting the image forming operation on the surface to be scanned 8. To be more accurate, the BD signal (synchronizing signal) obtained by detecting the output signal of the BD sensor 12 is used to regulate the timing of starting the image forming operation on the surface to be scanned 8.

As pointed out above by referring to FIG. 3, the photosensitive drum 101 is driven to rotate at a constant rate in synchronism with the drive signal of the semiconductor laser 1. As the photosensitive drum 101 turns, the photosensitive surface (surface to be scanned) moves relative to the light spot in the sub-scanning direction to consequently form an electrostatic latent image on the photosensitive surface. As a matter of fact, the electrostatic latent image is formed as a result of the potential difference between the areas exposed to the light spot and those not exposed to the light spot. Then, an image is visually produced on a sheet of paper by means of a known electrophotographic process as described earlier by referring to FIG. 3. With this embodiment, the technique of normal development of causing electrified toner to adhere to the unexposed areas is used.

Figure 10A:
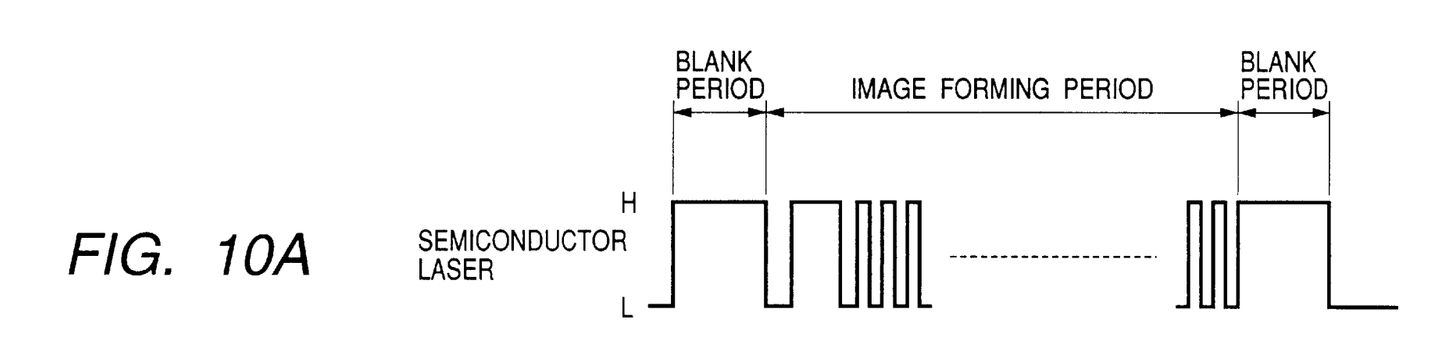
FIGS. 10A, 10B and 10C are respective timing charts of operation of the semiconductor laser, the BD sensor and the APC circuit of the image forming apparatus of FIG. 3.
Figure 10B:
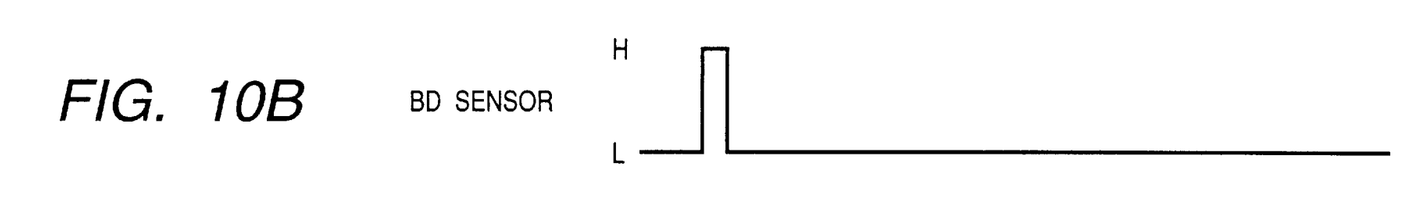
Figure 10C:
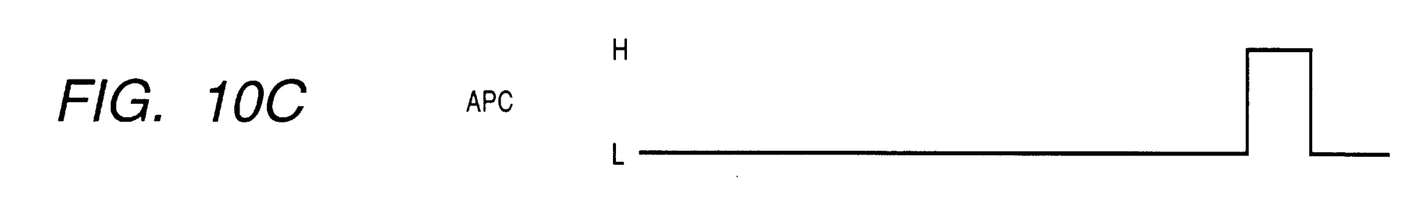

FIGS. 10A through 10C are respective timing charts of operation of the semiconductor laser, the BD sensor and the APC circuit of this embodiment of image forming apparatus for the period of a scanning cycle of the light spot that is made to scan the photosensitive drum repeatedly. FIG. 10A shows the operation of the semiconductor laser. It will be seen from FIG. 10A that the semiconductor laser is ON when the signal applied to it is at level High (H) and OFF when the signal is at level Low (L). FIG. 10B shows the operation of the BD sensor. It operates to detect the BD signal (synchronizing signal) when the signal applied to it is at level High (H). FIG. 10C shows the operation of the APC circuit. It operates to control the output power of the semiconductor laser when the signal applied to it is at level High (H).

As pointed out earlier, the photosensitive drum used for the image forming apparatus has a image forming region (effective image region) and blank regions (non-image-forming regions) arranged at the opposite sides of the image forming region in the main-scanning direction. The toner image formed in the image forming region is ultimately transferred onto an image receiving member. Assuming that a light spot is made to scan the surface of the photosensitive drum in the main-scanning direction, the period during which it scans the image forming region is referred to as image forming period whereas the period during which it scans either of the blank regions is referred to as blank period. As seen from FIG. 10A, a blank period exists before and after an image forming period in a single scanning operation of the light spot.

As seen from FIG. 10A, the light beam emitted from the semiconductor laser during an image forming period is modulated by the image signal applied to it and the light spot scanning the surface of the photosensitive drum is turned on/off accordingly. The surface of the photosensitive drum is electrified in advance and, as the surface is irradiated with the light spot whose intensity is modulated, the electric potential of the surface of the photosensitive drum becomes differentiated as a function of the location on the surface to form an electrostatic latent image there. More specifically, any area on the surface of the photosensitive drum irradiated with light (exposed area) loses the electric charge whereas any area on the surface of the photosensitive drum not irradiated with light (unexposed area) retains the electric charge. According to the present invention, toner of the type showing the polarity opposite to that of the electric charge that electrifies the surface of the photosensitive drum in advance is used onto the electrostatic latent image formed thereon in a manner as described above for so-called normal development. In other words, an unexposed area becomes a printed area (area carrying the toner). On the other hand, the semiconductor laser is constantly held on during all the blank periods when one of the blank regions is scanned on the photosensitive drum by the light spot in order to make toner not to adhere to the non-image forming regions on the surface of the photosensitive drum in the development process. This is an operation referred to as blank exposure, which is indispensable to image forming apparatus of the type that uses unexposed areas as printed areas (background exposure type) in order to prevent unnecessary toner from adhering to the surface of the photosensitive drum. The laser drive circuit 41 shown in FIG. 9 is made responsible for the control of the operation of turning on and off the semiconductor laser.

Image forming apparatus of the background exposure type typically comprises a photosensitive drum formed by using amorphous silicon. The photosensitive drum of the apparatus is positively charged with electricity for primary electrification prior to exposure to light. Then, the electric charge of the exposed areas is neutralized as a light spot is made to scan the electrified surface of the photosensitive drum. Then, negatively charged toner is made to adhere to the unexposed areas of the surface of the photosensitive drum in the subsequent development process. Thereafter, an image is formed on a sheet of paper by a known electrophotographic process including a transfer step and a fixing step.

With this embodiment, the APC operation is conducted in the blank exposure period after the scanning operation of the image forming period of a single scanning cycle of the light spot and before the start of the next scanning cycle as seen from FIG. 10A. The blank period before the image forming period is used for detecting the BD signal. With this arrangement, this embodiment provides the advantage of securing a sufficient time period for the APC operation without sacrificing the scanning efficiency unlike known image forming apparatus with which the APC operation is conducted before detecting the BD signal in the off-drum scanning period that comes before the image forming period.

Figures 11A, 11B:
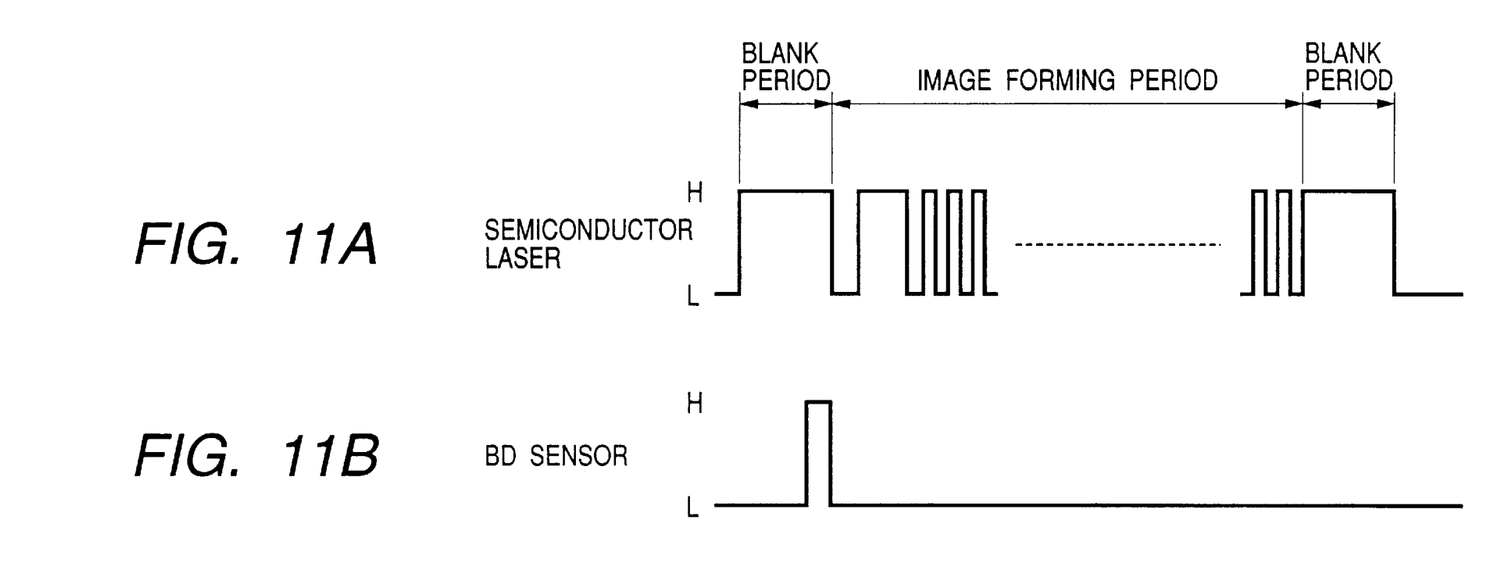
FIGS. 11A, 11B and 11C are respective timing charts of operation of the semiconductor laser, the BD sensor and the APC circuit of another embodiment of image forming apparatus according to the invention.
Figure 11C:
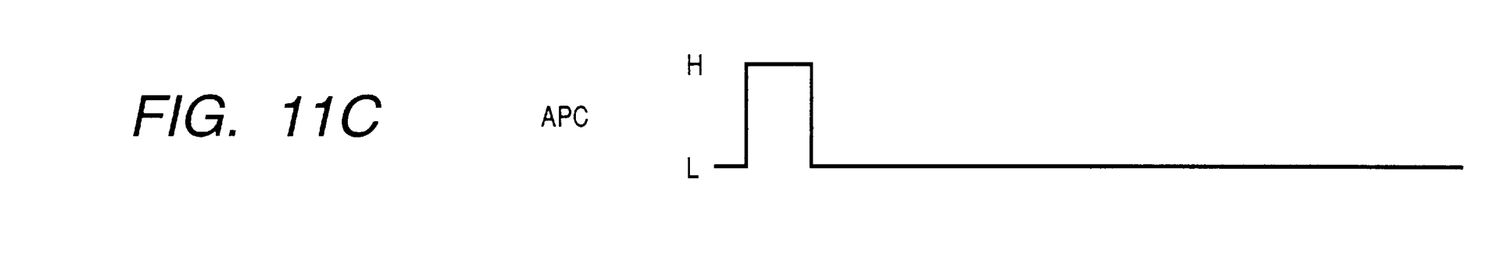
Figure 12A:
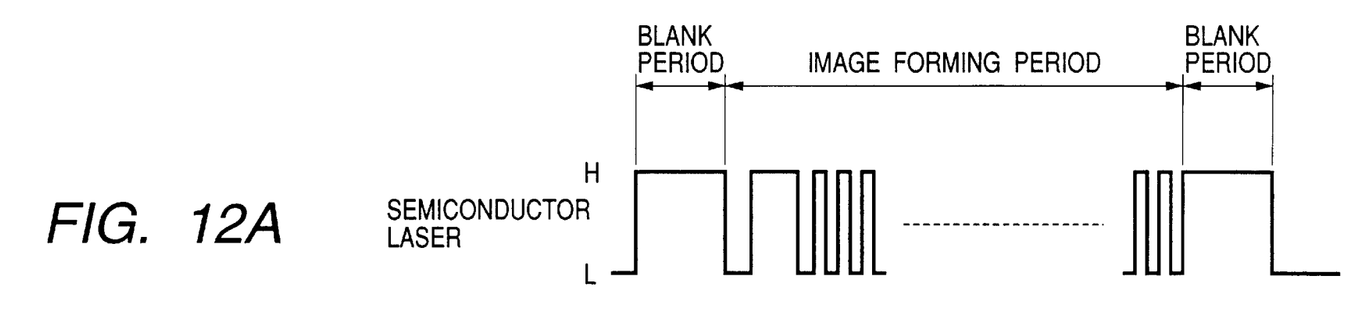
FIGS. 12A, 12B and 12C are respective timing charts of operation of the semiconductor laser, the BD sensor and the APC circuit of still another embodiment of image forming apparatus according to the invention.
Figure 12B:
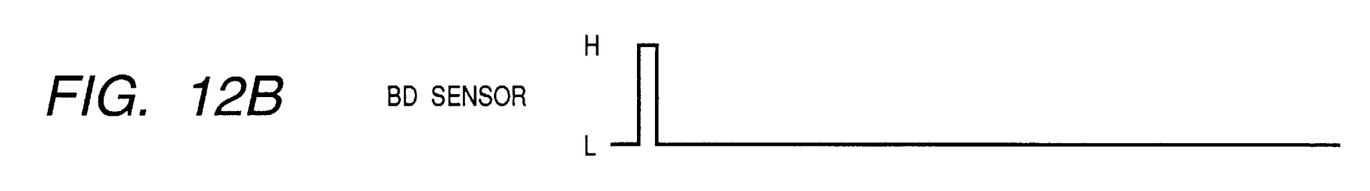
Figure 12C:
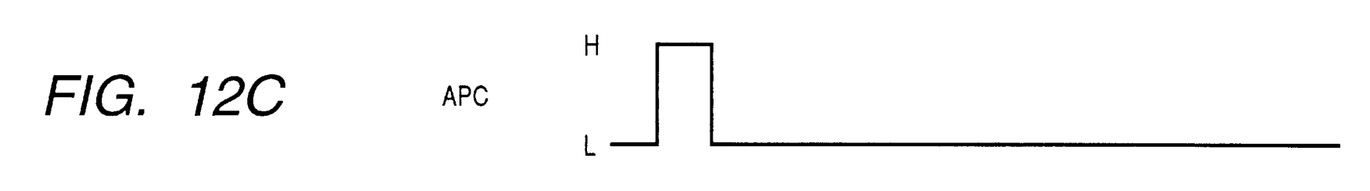

With this embodiment, the detection of the BD signal and the APC operation are conducted in the blank periods before and after the image forming period, respectively. However, alternatively, the APC operation and the detection of the BD signal may be sequentially conducted in the blank period before the image forming period as shown in FIGS. 11A through 11C. Still alternatively, the detection of the BD signal and the APC operation may be sequentially conducted in the blank period before the image forming period as shown in FIGS. 12A through 12C, where the APC operation comes after the detection of the BD signal. The timing arrangement of FIGS. 11A through 11C and that of FIGS. 12A through 12C are same as that of FIGS. 2A through 2C illustrating the prior art in that both the APC operation and the detection of the BD signal are conducted in the blank period before the image forming period. However, it will be appreciated that, according to the invention, the semiconductor laser is constantly held on and does not need to be turned off before the image forming period unlike the prior art because the technique of normal development is used for the present invention. As a result, a sufficient time period can be allocated to the APC operation. Note that FIGS. 11A through 11C are respective timing charts of operation of the semiconductor laser, the BD sensor and the APC circuit of another embodiment and FIGS. 12A through 12C are respective timing charts of operation of the semiconductor laser, the BD sensor and the APC circuit of still another embodiment of image forming apparatus according to the invention. Since they are similar to FIGS. 10A through 10C and hence will be understood easily, they will not be described here any furhter.

The scanning efficiency of known image forming apparatus using an overfilled optical system is normally about 90% and hence it has hitherto been difficult for such apparatus to secure a sufficient time for APC. To the contrary, an image forming apparatus according to the invention can secure a sufficient time for APC so that the APC operation can be conducted accurately.

As pointed out above, while the present invention is particularly suitably applicable to image forming apparatus using an overfilled optical system, it is also applicable to image forming apparatus using an underfilled optical system so as to allow them to secure a sufficient time for APC without sacrificing the scanning efficiency. An underfilled optical system is an optical system where the light beam striking an optical deflector has a width smaller than that of one of the plurality of deflection planes of the optical deflector as viewed in the main-scanning direction.

While the laser drive circuit, the APC circuit and the synchronizing signal detecting circuit of each of the above embodiments are described as so many separated circuits, a single central processing unit (CPU) may be used to replace them and perform their operations. The present invention covers embodiments using an CPU. In other words, the terms of an automatic power control circuit, a drive circuit and so on as used in the appended claims do not necessarily mean that they are so many separate circuits.

While the light beam emitted from the rear facet of the semiconductor laser is received by a photodetector to detect the BD signal in any of the above embodiments, the light beam emitted from the front facet of the semiconductor laser to scan the surface to be scanned may be partly led to the photodetector in order to detect the BD signal.

Note that the present invention is by no means limited to the above described embodiments, which may be altered and/or modified in various different ways. Such variations and modifications are found within the scope of the present invention as defined by the appended claims for patent.

What is claimed is:

1. An image forming apparatus comprising:
   a light source for emitting a light beam modulated according to an image signal applied thereto;
   an optical deflector for repeatedly deflecting the light beam emitted from said light source;
   a focusing optical system for focusing the light beam deflected by said optical deflector on a surface to be scanned to form a light spot there, the surface to be scanned being scanned repeatedly in a main-scanning direction;
   a photosensitive member arranged at the surface to be scanned and exposed selectively to the light spot, said photosensitive member having an image forming region and blank regions arranged at opposite ends of the image forming region in the main-scanning direction;
   a developing unit for causing toner to adhere to unexposed areas of said photosensitive member and developing an image;
   a photodetector for receiving part of the light beam emitted from said light source;
   an automatic power control circuit for controlling an output power of said light source on the basis of an output of said photodetector;
   a synchronizing signal sensor for receiving part of the light beam deflected by said optical deflector and outputting a synchronizing signal; and
   a drive circuit for driving said light source according to the image signal applied thereto during a period of scanning the image forming region of said photosensitive member by the light spot and for energizing said light source during periods of scanning the blank regions of said photosensitive member by the light spot thereby exposing the blank regions to prevent toner from adhering thereto,
   wherein said automatic power control circuit controls the output power of said light source based on a detection by said photodetector during at least one of the periods of scanning the blank regions of said photosensitive member by the light spot, and
   wherein said drive circuit regulates the timing of starting an operation of forming an image on said photosensitive member on the basis of the synchronizing signal.

2. An image forming apparatus according to claim 1, wherein said synchronizing signal sensor receives part of the light beam deflected by said optical deflector and outputs the synchronizing signal during a period when the light spot is scanning the blank region located at the starting side of a scanning operation and said automatic power control circuit controls the output power of said light source during a period when the light spot is scanning the blank region located at the terminating side of the scanning operation.

3. An image forming apparatus according to claim 1, wherein said automatic power control circuit controls the output power of said light source during a period when the light spot is scanning the blank region located at the starting side of a scanning operation and said synchronizing signal sensor subsequently receives part of the light beam deflected by said optical deflector and outputs the synchronizing signal also during the period when the light spot is scanning the blank region located at the starting side of the scanning operation.

4. An image forming apparatus according to claim 1, wherein said synchronizing signal sensor receives part of the light beam deflected by said optical deflector and outputs the synchronizing signal during a period when the light spot is scanning the blank region located at the starting side of a scanning operation and said automatic power control circuit subsequently controls the output power of said light source also during the period when the light spot is scanning the blank region located at the starting side of the scanning operation.

5. An image forming apparatus according to claim 1, wherein the period of scanning the image forming region of said photosensitive member by the light spot is not smaller than 70% of a complete scanning period of the light spot.

6. An image forming apparatus according to claim 1, further comprising an incident optical system for causing the light beam emitted from said light source to strike a deflection plane of said optical deflector as a linear image extending in the main-scanning direction.

7. An image forming apparatus according to claim 6, wherein the light beam striking the deflection plane of said optical deflector has a width greater than that of the deflection plane as viewed in the main-scanning direction.

8. An image forming apparatus according to claim 7, wherein the light beam emitted from said light source strikes the deflection plane substantially along the center of a deflection angle of said optical deflector in a main-scanning section.

9. An image forming apparatus according to claim 8, wherein the light beam emitted from said light source strikes the deflection plane of said optical deflector with a predetermined angle and not perpendicularly relative to the deflection plane in a sub-scanning section.

10. An image forming apparatus according to claim 9, wherein said incident optical system shares part of the optical elements of said focusing optical system.

11. An image forming apparatus according to claim 1, wherein said focusing optical system establishes an optically conjugate relationship between the deflection plane of said optical deflector and the surface to be scanned in a sub-scanning section.

12. An image forming apparatus according to claim 1, wherein said light source comprises a semiconductor laser for emitting light beams respectively from oppositely disposed facets thereof, wherein the light beam emitted from one of the facets of the semiconductor laser is deflected by said optical deflector while the light beam emitted from the other facet is received by said photodetector.

13. An image forming apparatus according to claim 1, wherein said focusing optical system comprises an fθ lens and a cylindrical mirror having power only in a sub-scanning direction.

14. An image forming apparatus according to claim 1, wherein said optical deflector comprises a rotary polygon mirror.

15. An image forming apparatus according to claim 1, further comprising a printer controller for transforming code data input from an external device into an image signal and applying it to said drive circuit.

16. An image forming apparatus comprising:
a light source for emitting a light beam modulated according to an image signal applied thereto;
an optical deflector for repeatedly deflecting the light beam emitted from said light source;
a focusing optical system for focusing the light beam deflected by said optical deflector on a surface to be scanned to form a light spot there, the surface to be scanned being scanned repeatedly in a main-scanning direction;
a photosensitive member arranged at the surface to be scanned and exposed selectively to the light spot, said photosensitive member having an image forming region and blank regions arranged at opposite ends of the image forming region in the main-scanning direction;
a developing unit for causing toner to adhere to unexposed areas of said photosensitive member and developing an image;
a synchronizing signal sensor for receiving part of the light beam deflected by said optical deflector and outputting a synchronizing signal; and
a drive circuit for driving said light source according to the image signal applied thereto during a period of scanning the image forming region of said photosensitive member by the light spot and for energizing said light source during periods of scanning the blank regions of said photosensitive member by the light spot thereby exposing the blank regions to prevent toner from adhering thereto,
wherein said synchronizing signal sensor receives part of the light beam deflected by said optical deflector and outputs the synchronizing signal during a period when the light spot is scanning the blank regions of said photosensitive member.

17. An image forming apparatus according to claim 16, wherein said synchronizing signal sensor receives part of the light beam deflected by said optical deflector and outputs the synchronizing signal during a period when the light spot is scanning the blank region located at the starting side of a scanning operation.

18. An image forming apparatus according to claim 16, wherein the period of scanning the image forming region of said photosensitive member by the light spot is not smaller than 70% of a complete scanning period of the light spot.

19. An image forming apparatus according to claim 16, further comprising an incident optical system for causing the light beam emitted from said light source to strike a deflection plane of said optical deflector as a linear image extending in the main-scanning direction.

20. An image forming apparatus according to claim 19, wherein the light beam striking the deflection plane of said optical deflector has a width greater than that of the deflection plane as viewed in the main-scanning direction.

21. An image forming apparatus according to claim 20, wherein the light beam emitted from said light source strikes the deflection plane substantially along the center of a deflection angle of said optical deflector in a main-scanning section.

22. An image forming apparatus according to claim 21, wherein the light beam emitted from said light source strikes the deflection plane of said optical deflector with a predetermined angle and not perpendicularly relative to the deflection plane in a sub-scanning section.

23. An image forming apparatus according to claim 22, wherein said incident optical system shares part of the optical elements of said focusing optical system.

24. An image forming apparatus according to claim 16, wherein said focusing optical system establishes an optically conjugate relationship between a deflection plane of said optical deflector and the surface to be scanned in a sub-scanning section.

25. An image forming apparatus according to claim 16, wherein said light source comprises a semiconductor laser for emitting light beams respectively from oppositely disposed facets thereof, wherein the light beam emitted from one of the facets of the semiconductor laser is deflected by said optical deflector while the light beam emitted from the other facet is received by a photodetector.

26. An image forming apparatus according to claim 16, wherein said focusing optical system comprises an fθ lens and a cylindrical mirror having power only in a sub-scanning direction.

27. An image forming apparatus according to claim 16, wherein said optical deflector comprises a rotary polygon mirror.

28. An image forming apparatus according to claim 16, further comprising a printer controller for transforming code data input from an external device into an image signal and applying it to said drive circuit.

* * * * *